Sept. 11, 1951     H. H. MERRIMAN     2,567,571
SCREW ADVANCED RAPID TRAVERSE FORCE APPLYING UNIT
Filed Oct. 15, 1947
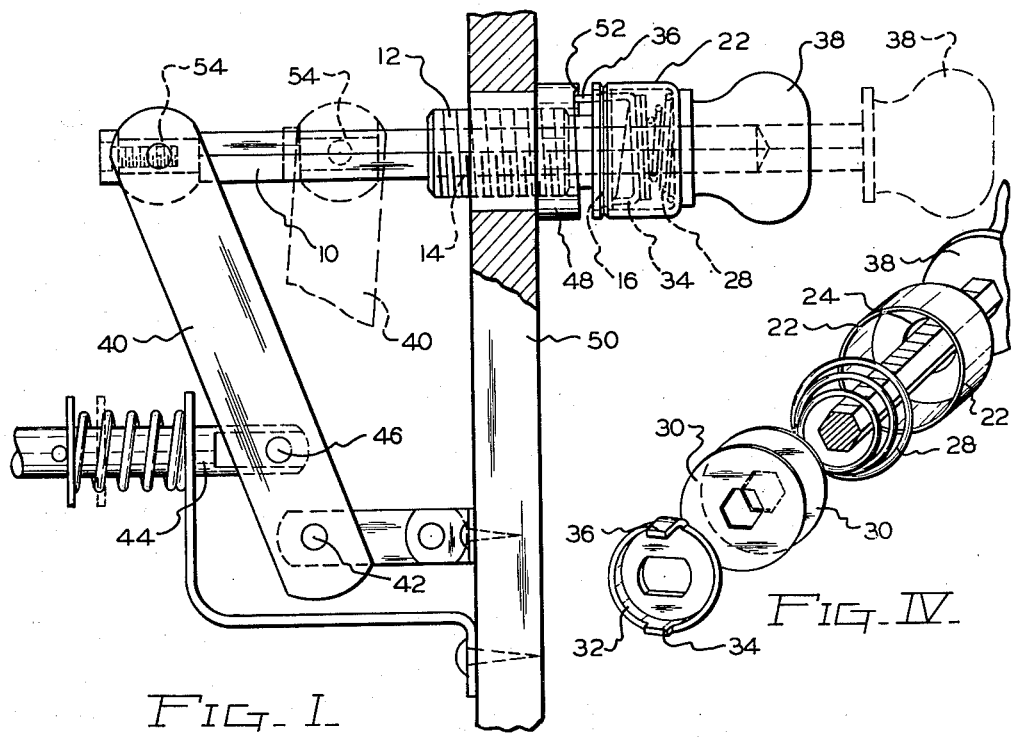
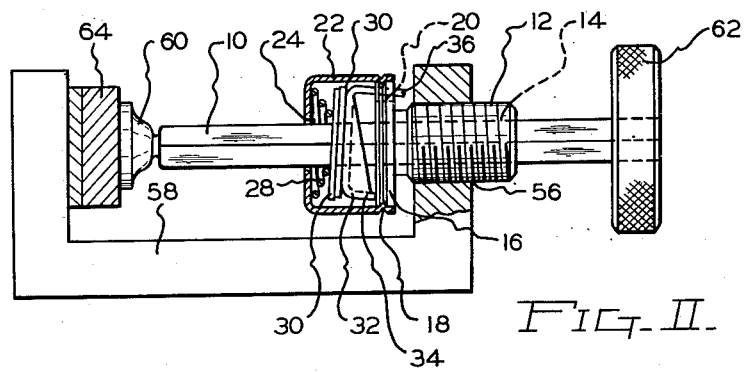
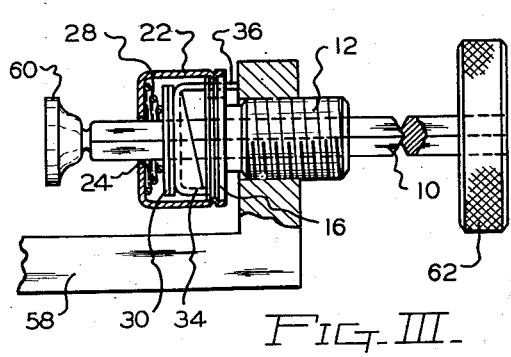
Inventor
HENRY H. MERRIMAN
By Beaman & Patch
Attorneys Patented Sept. 11, 1951

2,567,571

UNITED STATES PATENT OFFICE 2,567,571

SCREW ADVANCED RAPID TRAVERSE FORCE APPLYING UNIT

Henry H. Merriman, Jackson, Mich.

Application October 15, 1947, Serial No. 780,073

6 Claims. (Cl. 74—503)

The present invention relates to push and pull devices of the type having a quick acting or rapid traverse feature in combination with the mechanical advantage of a screw. Such devices have heretofore been embodied into clamps, vises, jigs, fixtures and the like. Many other uses readily suggest themselves.

One objection present in prior devices has developed in actual use wherein the screw is gradually advanced in one direction or the other further than necessary or advisable. Thus one of the objects of the present invention is to provide a pressure unit structure in which the screw is returned to its preferred location in the assembly each time to release to rapid traverse.

Another object is to provide a device of the type described inexpensively manufactured from stamping and automatic screw machine parts, of simple assembly, yet is capable of holding relatively great loads without slipping or destruction of the component parts.

A further object is to provide a device of the character described in which a single member applies a force on axial and rotary movement in one direction and releases a clutch on rotational movement in the opposite direction.

These and other objects and advantages residing in the construction, combination, and arrangement of parts will become apparent and fully understood from a consideration of the following specification and claims:

In the drawings:

Fig. I is a side view of the invention applied to the hand brake of an automobile, Fig. II shows the invention applied to a vise with the vise closed and the pressure unit under axial thrust, Fig. III is similar to Fig. II with the pressure unit released to rapid traverse or with the vise open, and Figure IV is an exploded view of the component parts of the pressure unit.

The improved pressure unit comprises an axially movable bar 10 which may perform its work in either tension, as in Figure I, or compression, as in Figure II. The bar 10 may take many cross sectional shapes, preferably one that will provide an axially slidable driving connection between the bar 10 and the threaded bushing 12. As more clearly shown in Figure IV, in the illustrated form of the invention, the bar 10 is of hexagonal cross section with a similar shaped hole 14 broached in the bushing 12 of a size providing a free sliding fit between the parts.

The bushing 12 has an integral collar 16, with a peripheral groove 18, and a cross slot 20. A sheet metal stamping 22 provides a housing having an aperture 24 and its edges 26 rolled into the groove 18 to assemble the housing 22 to the collar 16.

The structure for locking the bushing 12 to the bar 10 is assembled in the housing 22 and comprises, in the illustrated form, a biasing spring 28, a plurality of canting or locking plates 30, in the form of simple flat stampings and combination canting and rocking plate 32.

Plates 30 and 32 are all suitable apertured to freely slide upon the bar 10 except when sufficiently cocked upon the bar to grip the same. This principle of frictional locking is well known in this art.

The plate 32 is preferably a stamping with an integral fulcrum portion at 34 and an integral extension 36 diametrically opposite thereto and extending through the slot 20. As shown, the fulcrum 34 engages the collar 16 while the extension 36 is designed to engage an abutment to rock the plates 30 and 32 from the inclined locking position of Figure II to the vertical free sliding position of Figure III. As will be readily understood, the spring 28, continuously acts to bias the plates 30 and 32 into an inclined locking position due to the off set location of the abutment 32.

In the adaption of the invention to a hand brake for automobiles shown in Figure I, the bar 10 is provided with a knob 38 at one end. At the opposite end the bar 10 is connected to a lever 40 pivoted at 42 to which a tension member 44, attached to the brake cable, is connected at 46. A nut 48 is supported in the dash 50 to receive the threaded bushing 12. To expedite the actuation of the extension 36 to rock the plates 30 and 32, the nut 48 may be provided with a lobe 52 so as to release the bar 10 to release the brake by a partial rotation of the knob 38 after the extension 36 engages the outer face of the nut 48. It will be understood that the bar 10 has a swivel connection at 54 with the upper end of the lever 40 to permit the bar 10 to rotate to advance the bushing 12 in the nut 48.

In operation the bar 10 is pulled out with rapid traverse to take up the slack in the brake cable and then the knob 38 is rotated anti-clockwise (in the particular example shown) to rotate the bar 10 and advance the bushing 12 through the fixed nut 48 to set the brake with the mechanical advantage of the screw. To release the brakes, the knob 38 is rotated clockwise to bring the extension 36 into engagement with the nut 48 and thereafter a partial rotation will rock the plates 30 and 32 into the vertical position of Figure III to permit the bar 10 to slide freely in the bushing 12, to release the brake.

In Figures II and III the bushing 12 is mounted in a threaded aperture 56 in the vise or clamp frame 58. At one end the bar 10 has a clamping foot 60 and at the other end a knob or handle 62. As shown in Figure II the thrust of the bar 10 against the parts 64 being clamped is transmitted to the bushing 12 through the plates 30 and 32. To release the bar 10 for rapid traverse the bushing 12 is threaded out of the aperture 56 by rotating the bar 10 to the extent required to bring the extension 36 into engagement with the frame 58.

From this it will appear that the bushing 12 is always returned to the position of Figure III after each clamping of the parts 64. This avoids gradual threading the bushing 12 out of the frame 58 following repeated use as where the vise is being used in production.

It is also to be understood that the bushing 12 will be returned to the position shown in Figure I, within the nut 48, following each brake release.

Having thus described my invention what I claim as new and desire to cover by Letters Patent is:

1. A combination screw advanced and rapid traverse force applying unit comprising a threaded bushing adapted to be received in a threaded aperture and axially moved in opposite directions therein upon rotation, a housing located at one end of said bushing and attached thereto, aligned longitudinally extending apertures in said bushing and housing to receive a bar, clutch means located in said housing, an operative connection between said clutch means and said bushing, a bar extending through said aligned openings and engageable by said clutch means to resist relative axial movements between said bar and said bushing, means by which said clutch is actuated to release said bar for longitudinal movement relative to said bushing, and means constituting a rotational drive connection between said bar and bushing whereby said bushing may be rotated by said bar.

2. A combination screw advanced and rapid traverse unit of the type described comprising a threaded bushing having a flange at one end, a housing attached to said flange, aligned longitudinally extending apertures in said bushing and said housing to receive a bar, a bar received in said apertures, a tiltable clutch member located in said housing and embracing said bar, spring means biasing said clutch member to a bar engaging position to resist relative longitudinal movement between said bushing and bar, a member having a portion, exteriorly of said housing and operatively connected to said tiltable member, a threaded part to receive said bushing, abutment structure associated with said part and adapted to be engaged by said member to tilt the member into a bar releasing position, whereby said bar and bushing are released for relative longitudinal movement.

3. A combination screw advanced and rapid traversible unit of the type described comprising an externally threaded bushing, a radial flange portion disposed to one side of the threaded portion of said bushing, a sheet metal housing of cup shaped construction attached to said flange, axially aligned longitudinally extending apertures in said bushing and housing, a bar adapted to be received in said apertures for relative longitudinal sliding movement, a clutch member located in said housing, means normally actuating said clutch into a position to engage said bar to resist relative longitudinal movement between said bushing and said bar, and means projecting exteriorly of said housing and adapted to be engaged to move said clutch to a bar releasing position to permit relative longitudinal movement between said bar and said bushing and means constituting a rotational drive connection between said bar and bushing whereby said bushing may be rotated by said bar.

4. In combination, a fixture having a threaded aperture and an abutment surface, an externally threaded bushing in said aperture, a force applying bar, a longitudinal aperture in said bushing to receive said bar with a sliding fit, said bar and said aperture in said bushing being shaped and constructed to rotate together as a unit about their longitudinal axis upon a rotational force being applied to said bar whereby said bushing has axial movement in said threaded aperture, a clutch imposed between the said bar and bushing, means continuously acting to urge said clutch into a bar gripping position to resist relative sliding movement of said bar in said position, a member supported for movement with said bushing and associated with said clutch to move the same into a bar releasing position, said member having a portion engaging with said abutment surface upon predetermined axial movement of said bushing in said threaded aperture to release said bar with said bushing in a predetermined position.

5. In combination, a fixture having a threaded aperture, a rapid traversible screw advanced force applying unit threaded in said aperture, said unit comprising an externally threaded bushing having a non-circular longitudinal aperture therein, a force applying bar corresponding in cross section to said non-circular aperture and having a free sliding fit therein for rotating said bushing when said bar is rotated and for rapid traverse longitudinal movement relative to said bushing, a frictional one way clutch imposed between said bushing and bar in the form of a tiltable plate, means continuously acting to tilt said plate to resist relative axial movement between said bushing and said bar whereby upon rotation of said bar it is advanced by said threaded bushing, means associated with said plate actuatable upon predetermined relative movement between said bushing and said fixture to rock said plate to a bar releasing position.

6. An axially movable force applying bar and clutch assembly for installation in a fixture comprising a bar adapted to be supported in the fixture for both axial bodily movement to apply a force and for rotational movement in one direction about the longitudinal axis of the bar to release the clutch said bar being rotatable in the opposite direction to apply a force additional to said axial force applying movement of the bar, a clutch, means acting upon said clutch to urge the same into a bar gripping position to resist relative axial movement between said bar and clutch in one direction, thrust abutment structure for transferring axial forces of said bar to the fixture through said clutch, a member associated with said clutch and movable from one position to another to move said clutch out of said bar gripping position into a bar releasing position, said member being constructed and arranged to engage with an abutment surface on the fixture upon rotational movement with said bar to move said clutch into a position releasing said bar for relative axial movement.

HENRY H. MERRIMAN.

REFERENCES CITED

The following references are of record in the file of this patent:

UNITED STATES PATENTS

| Number | Name | Date |
| --- | --- | --- |
| 1,719,530 | Bovey | July 2, 1929 |
| 1,738,862 | Wiswell | Dec. 10, 1929 |
| 2,145,161 | Douglas | Jan. 24, 1939 |
| 2,368,843 | Kees | Oct. 6, 1945 |
| 2,396,823 | Burbank | Mar. 19, 1946 |
| 2,424,037 | Jenkins | July 15, 1947 |